United States Patent
Chou

(10) Patent No.: US 9,829,609 B2
(45) Date of Patent: Nov. 28, 2017

(54) LENS ASSEMBLY WITH LIGHT BLOCKING MEMBER AND IMAGING LENS INCLUDING THE SAME

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/494,700

(22) Filed: Apr. 24, 2017

(65) Prior Publication Data

US 2017/0227687 A1    Aug. 10, 2017

Related U.S. Application Data

(63) Continuation of application No. 14/851,563, filed on Sep. 11, 2015, now Pat. No. 9,671,610.

(30) Foreign Application Priority Data

Aug. 11, 2015 (TW) .............................. 104212949 U

(51) Int. Cl.
```
G02B 27/00    (2006.01)
G02B 5/00     (2006.01)
G02B 13/00    (2006.01)
G03B 11/00    (2006.01)
G02B 7/00     (2006.01)
G02B 7/02     (2006.01)
G02B 27/18    (2006.01)
```
(52) U.S. Cl.
CPC .............. *G02B 5/005* (2013.01); *G02B 7/003* (2013.01); *G02B 7/021* (2013.01); *G02B 13/001* (2013.01); *G02B 13/0055* (2013.01); *G02B 27/18* (2013.01); *G03B 11/00* (2013.01)

(58) Field of Classification Search
CPC .......... G02B 5/005; G02B 5/006; G03B 9/02; G03B 9/00
USPC ....... 359/601, 614, 642, 737, 738, 739, 740, 359/819, 821, 830
See application file for complete search history.

(56) References Cited

U.S. PATENT DOCUMENTS 7,457,052 B2    11/2008   Hirata
8,570,673 B2    10/2013   Lai et al.
(Continued)

*Primary Examiner* — Arnel C Lavarias
(74) *Attorney, Agent, or Firm* — McClure, Qualey & Rodack, LLP

(57) ABSTRACT

A light blocking member includes a first surface, a second surface, an outside surface and an inside surface. The first surface includes a first asymmetric opening. The second surface includes a second asymmetric opening corresponding to the first asymmetric opening. The outside surface disposed between the first surface and the second surface includes a cutting portion and an arch portion. The cutting portion connects the first asymmetric opening and the second asymmetric opening. The inside surface is disposed between the first surface and the second surface. A virtual curved surface is formed between two ends of the cutting portion, and a virtual line is formed between a central point of the virtual curved surface and a central axis of the light blocking member. Two shapes of both of the first asymmetric opening and the second asymmetric opening with respect to two sides of the virtual line are asymmetric.

11 Claims, 15 Drawing Sheets

(56) References Cited

U.S. PATENT DOCUMENTS 9,671,610 B2 * 6/2017 Chou ................. G02B 27/0018
2007/0171554 A1 7/2007 Yoshii et al.

* cited by examiner

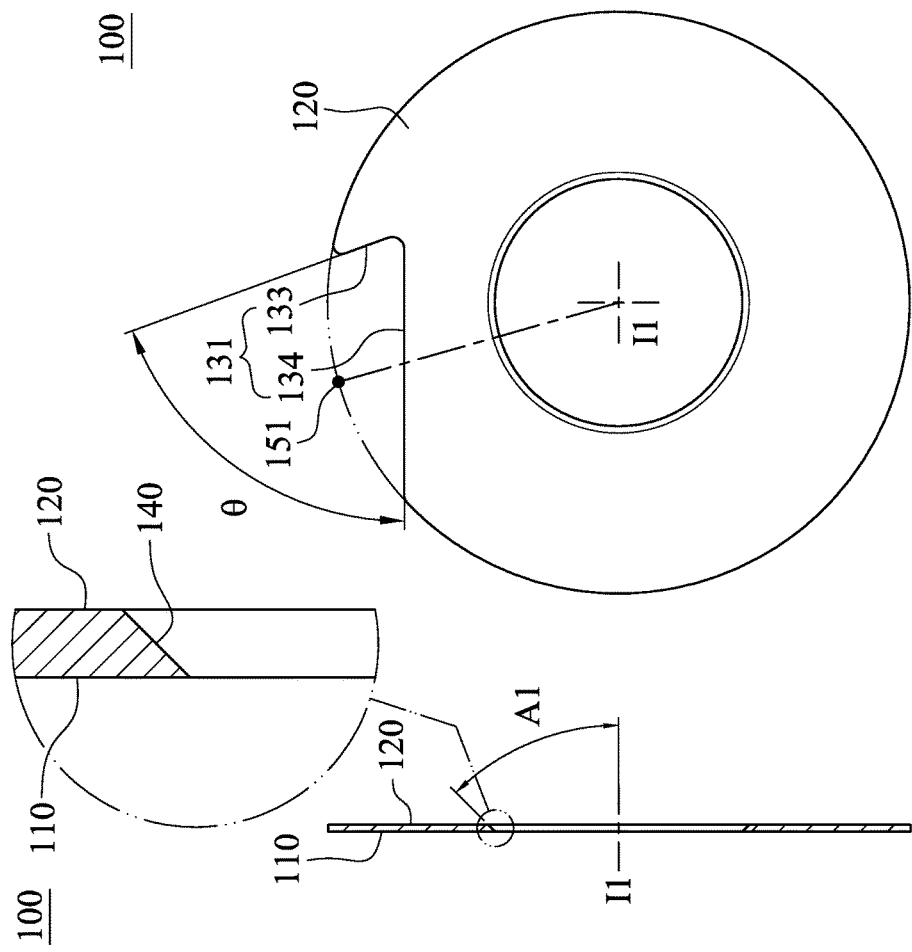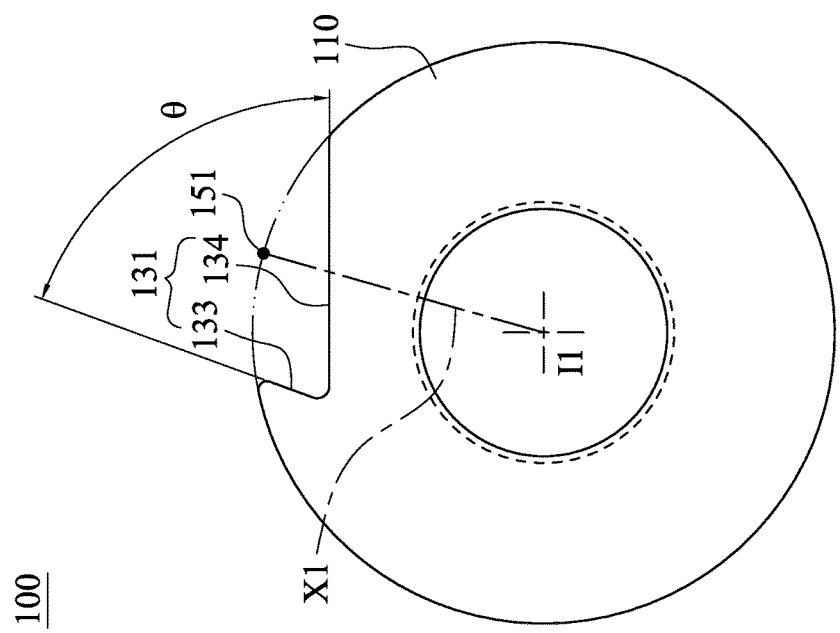

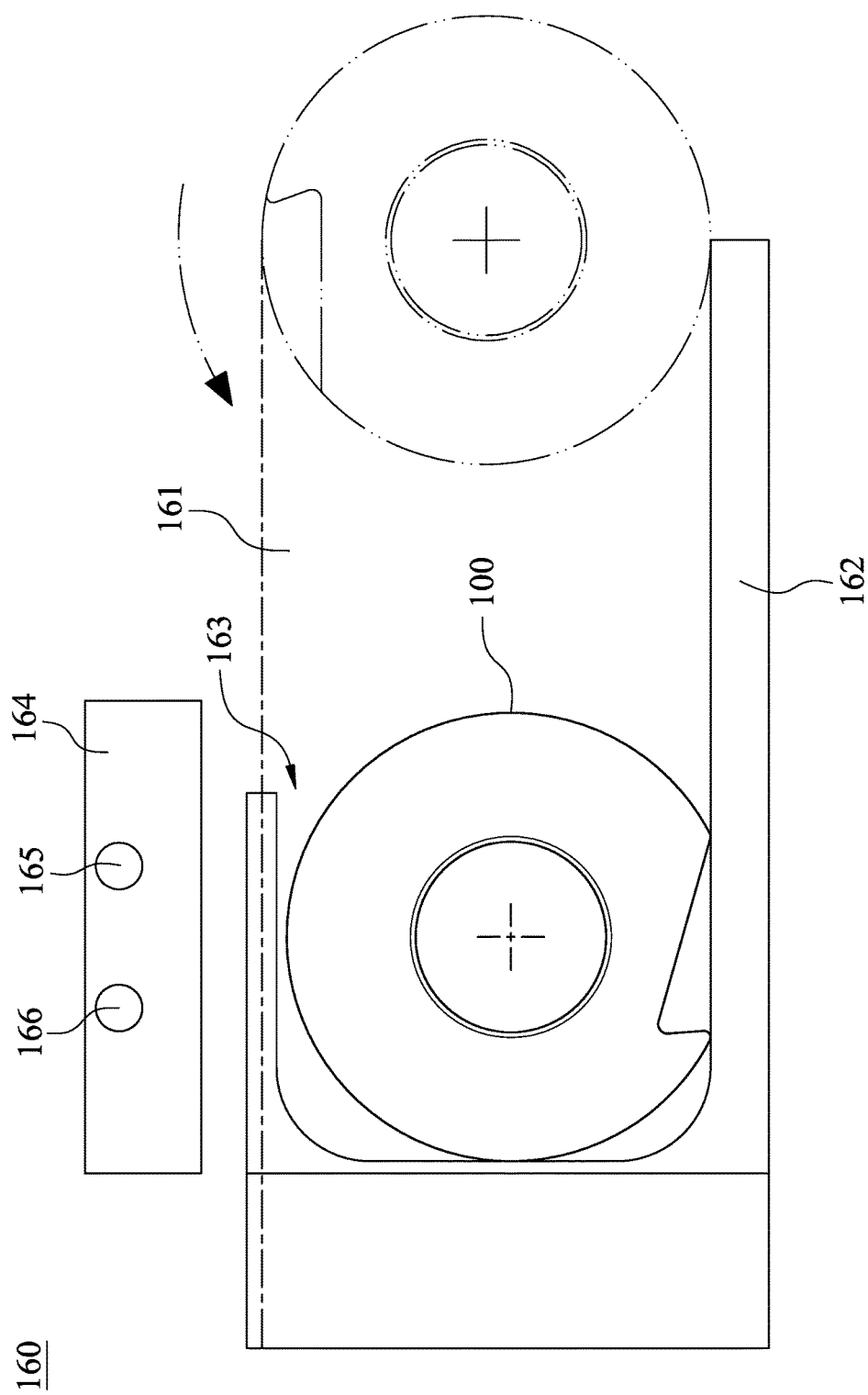

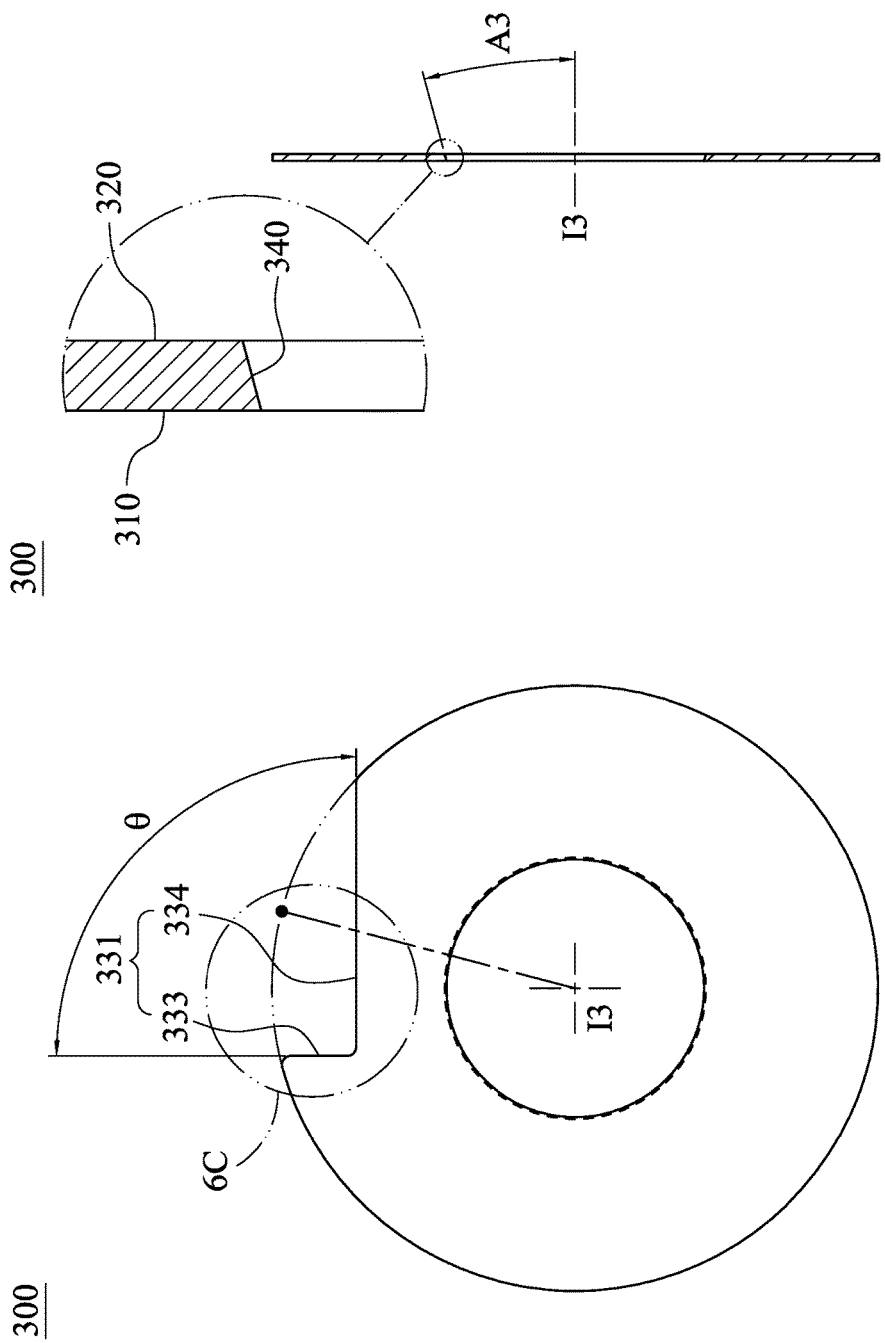

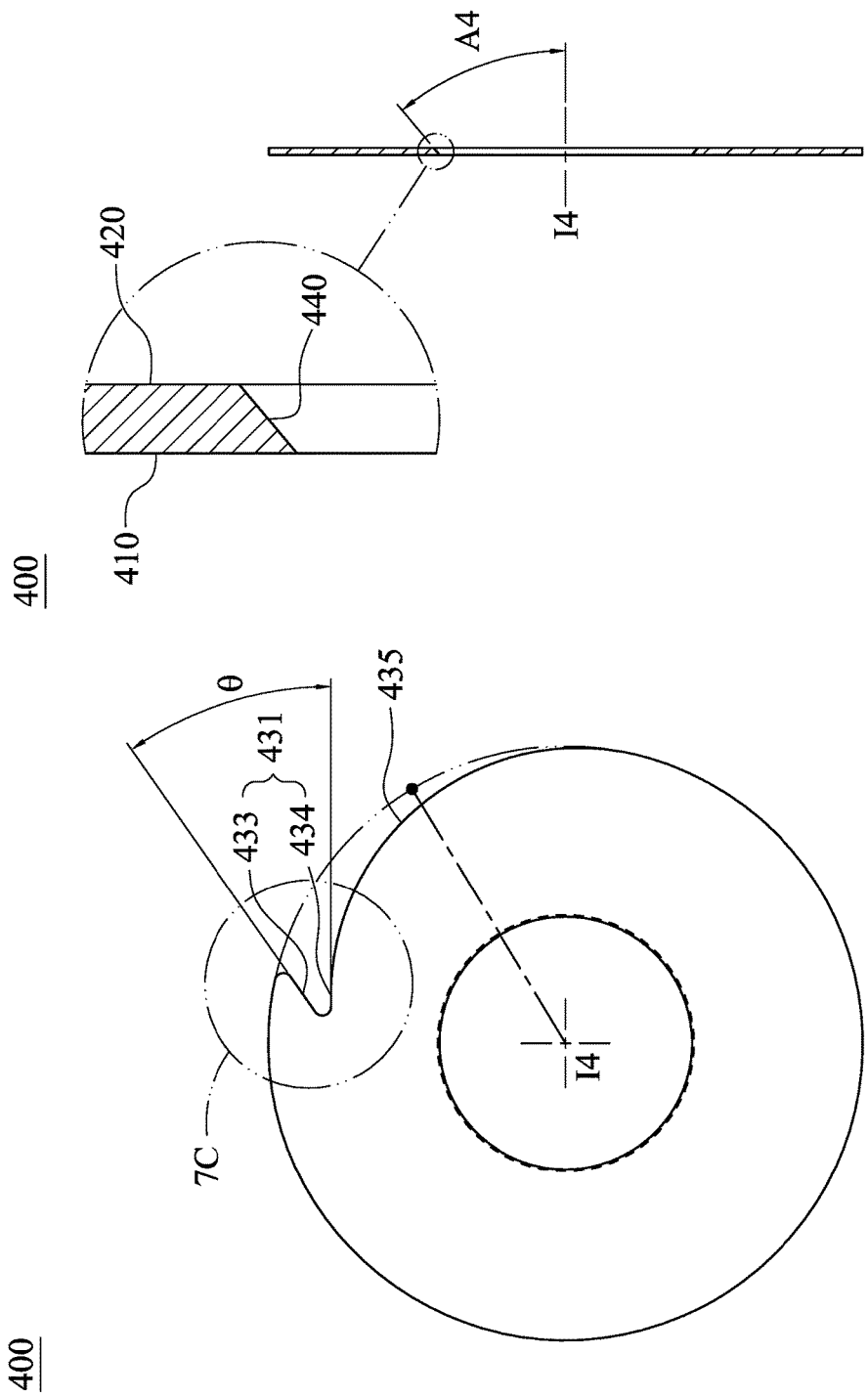

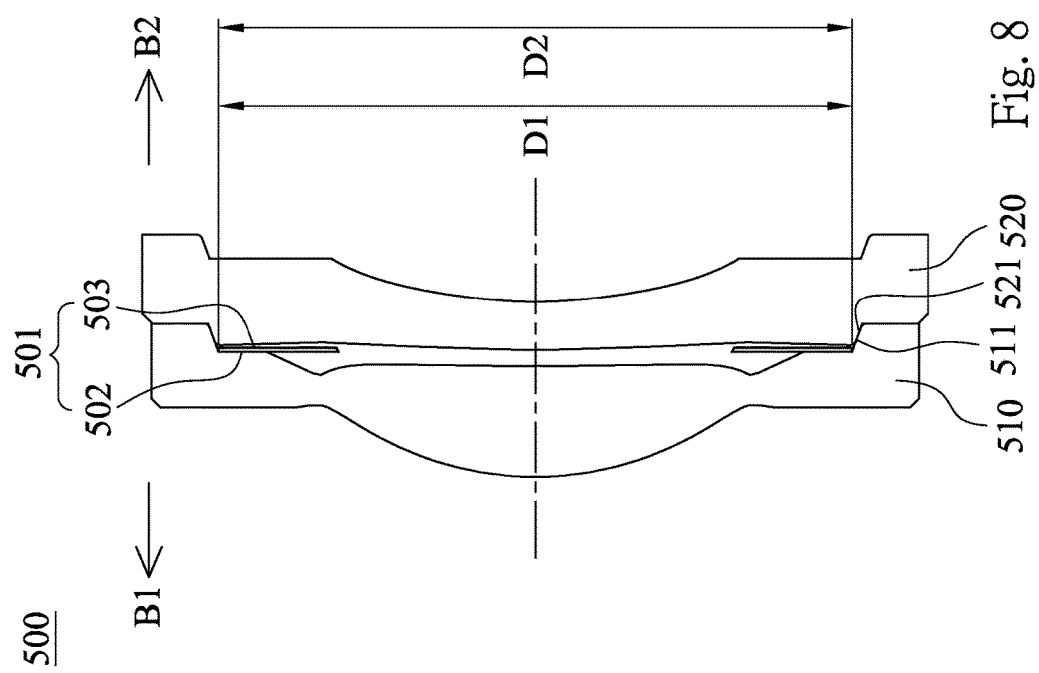

LENS ASSEMBLY WITH LIGHT BLOCKING MEMBER AND IMAGING LENS INCLUDING THE SAME

RELATED APPLICATIONS

The present application is a continuation of the application Ser. No. 14/851,563, filed Sep. 11, 2015, which claims priority to Taiwan Application Serial Number 104212949, filed Aug. 11, 2015, which is herein incorporated by reference

BACKGROUND

Technical Field

The present disclosure relates to a light blocking member, a lens assembly and an imaging lens. More particularly, the present disclosure relates to a light blocking member for preventing a miss operation, a lens assembly and an imaging lens having the same.

Description of Related Art

Recently, the portable devices, such as smart phone and pad, are developed rapidly and ubiquitous in the human life. The imaging lens disposed therein is thus becomes growth industry. With the improvement of the technology, more and more demands for high qualities of imaging lens come out. Therefore, in addition to improving the quality of imaging lens in optical design field, the precision of manufacturing and assembling processes are needed to be improved too.

The imaging lens usually includes a lens assembly which includes lens elements and a light blocking member disposed between the lens elements. The usage of the light blocking member not only can reduce the flare but also can improve the imaging quality of the imaging lens. However, because the sizes of the lens element and the light blocking member become smaller while the size of the imaging lens becomes small, thus the difficulties of assembling process as well as the difficulties of manufacturing process increase.

Besides, the conventional light blocking member is usually a ring structure made of black material, although the structure is easily to be made, it is needed to be further changed to fit the high quality demands.

Base on the aforementioned problems, how to improve the structure of the light blocking member, the precision of the assembling, and the quality of the imaging lens become a pursuit target for practitioners.

SUMMARY

According to one aspect of the present disclosure, a light blocking member includes a first surface, a second surface, an outsides surface and an inside surface. The first surface with a central hole includes a first asymmetric opening. The second surface with a central hole is corresponding to the first surface and includes a second asymmetric opening corresponding to the first asymmetric opening. The outside surface is disposed between the first surface and the second surface, and includes a cutting portion and an arch portion. The cutting portion connects the first asymmetric opening and the second asymmetric opening. The arch portion connects an edge of the first surface and an edge of the second surface, and is connected to two ends of the cutting portion. The inside surface is disposed between the first surface and the second surface, and connects the central hole of the first surface and the central hole of the second surface. A virtual curved surface is formed between the two ends of the cutting portion, and a virtual line perpendicular to a central axis of the light blocking member is formed between a central point of the virtual curved surface and the central axis of the light blocking member. Two shapes of both of the first asymmetric opening and the second asymmetric opening with respect to two sides of the virtual line are asymmetric.

According to another aspect of the present disclosure, a lens assembly includes a first lens element, a second lens element and the aforementioned light blocking member. The first lens element includes a first axial assembling surface, and the second surface includes a second axial assembling surface for assembling the first lens element and the second lens element to align a center of the first lens element and a center of the second lens element. The light blocking member is disposed between the first lens element and the second lens element. The light blocking member has a maximum diameter, one of the first assembling surface and the second assembling surface has a minimum diameter, and the maximum diameter is smaller than or equal to the minimum diameter.

According to further another aspect of the present disclosure, a lens assembly includes the aforementioned light blocking member.

According to yet another aspect of the present disclosure, an imaging lens includes the aforementioned lens assembly and an image sensor. The image sensor is disposed on an image surface of the lens assembly.

BRIEF DESCRIPTION OF THE DRAWINGS

The disclosure can be more fully understood by reading the following detailed description of the embodiment, with reference made to the accompanying drawings as follows:

FIG. 2A is a front view of the light blocking member as illustrated in FIG. 1;

FIG. 2B is a cross-section view of the light blocking member as illustrated in FIG. 1;

FIG. 2C is a rear view of the light blocking member as illustrated in FIG. 1;

FIG. 3 is a schematic view of a test device for testing the light blocking member as illustrated in FIG. 1;

FIG. 6A is a front view of a light blocking member according to a third embodiment of the present disclosure;

FIG. 6B is a cross-sectional view of the light blocking member as illustrated in FIG. 6A;

FIG. 7A is a front view of a light blocking member according to a forth embodiment of the present disclosure;

FIG. 7B is a cross-sectional view of the light blocking member as illustrated in FIG. 7A;

FIG. 8 is a cross-sectional view of a lens assembly according to a fifth embodiment of the present disclosure.

DETAILED DESCRIPTION

Figure 1:
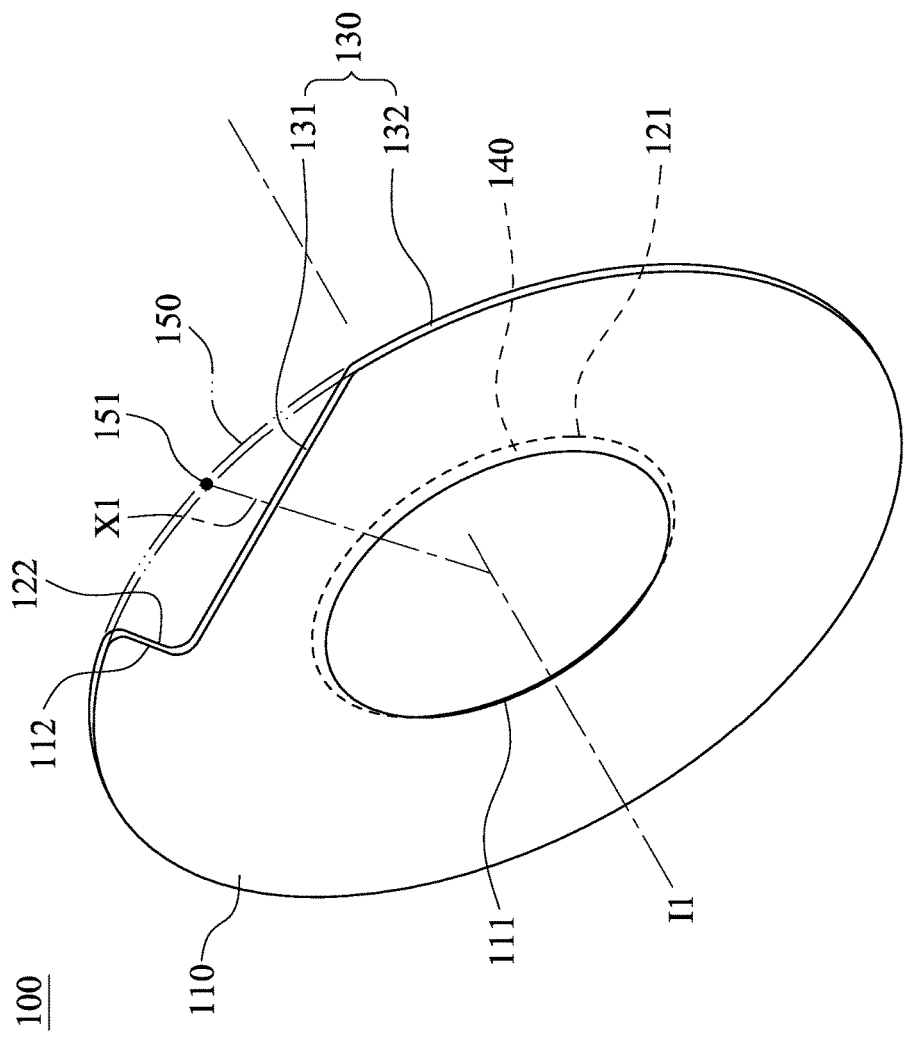
FIG. 1 is a schematic view of a light blocking member according to a first embodiment of the present disclosure.

FIG. 1 is a schematic view of a light blocking member 100 according to a first embodiment of the present disclosure. The light blocking member 100 includes a first surface 110, a second surface 120 (shown in FIG. 2B), an outside surface 130 and an inside surface 140.

The first surface 110 has a central hole 111 and includes a first asymmetric opening 112. The second surface 120 is corresponding to the first surface 110. The second surface 120 has a central hole 121 and includes a second asymmetric opening 122 corresponding to the first asymmetric opening 112.

The outside surface 130 is disposed between the first surface 110 and the second surface 120, and includes a cutting portion 131 and an arch portion 132. The cutting portion 131 connects the first asymmetric opening 112 and the second asymmetric opening 122. The arch portion 132 connects an edge of the first surface 110 and an edge of the second surface 120, and is connected to two ends of the cutting portion 131. The inside surface 140 is disposed between the first surface 110 and the second surface 120, and connects the central hole 111 of the first surface 110 and the central hole 121 of the second surface 120.

A virtual curved surface 150 is formed between the two ends of the cutting portion 131, and a virtual line X1 perpendicular to a central axis I1 of the light blocking member 100 is formed between a central point 151 of the virtual curved surface 150 and the central axis I1 of the light blocking member 100. Two shapes of both of the first asymmetric opening 112 and the second asymmetric opening 122 with respect to two sides of the virtual line X1 are asymmetric.

Through the asymmetric structures of the first asymmetric opening 112 and the second asymmetric opening 122 with respect to the virtual line X1, a projected outline of the first surface 110 is different from a projected outline of the second surface 120 so as to favor the judgment of a correct assembling direction, thus the light blocking member 100 in the present disclosure can prevent a miss assembling in the assembling process.

FIG. 2A is a front view of the light blocking member 100 as illustrated in FIG. 1, and FIG. 2C is a rear view of the light blocking member 100 as illustrated in FIG. 1. In the first embodiment, the first surface 110 is the front side of the light blocking member 100, and the second surface 120 is the rear side of the light blocking member 100. Thus only the first surface 110 can be seen in FIG. 2A while only the second surface 120 can be seen in FIG. 2C.

As Shown in FIGS. 2A and 2C, the central hole 111 of the first surface 110 is circular, and the central hole 121 of the second surface 120 is also circular, therefore, the central axis I1 of the light blocking member 100 is passed through a center of the central hole 111 and a center of the central hole 121.

The cutting portion 131 consists of two flat areas 133, 134 and only projected outlines of the flat areas 133, 134 can be seen in FIGS. 2A and 2C because of the drawing view. Although the junction of the two flat areas 133, 134 is formed curvedly due to a manufacturing process, it does not influence the judgment of the two flat areas 133, 134. An angle θ is formed between the two flat areas, and the following condition is satisfied: 20 degrees<θ<120 degrees. Preferably, the following condition is satisfied: 60 degrees<θ<100 degrees. θ is 70 degrees in the first embodiment.

To sum up, the light blocking member 100 in the first embodiment is a ring structure with an opening. Because the opening is asymmetric, the front view of the light blocking member 100 is different from the rear view of the light blocking member 100. As shown in FIGS. 2A and 2C, the directions which the angles θ face are opposite to each other.

FIG. 2B is a cross-sectional view of the light blocking member 100 as illustrated in FIG. 1. An extending direction of the inside surface 140 is not parallel to an extending direction of the central axis I1. That is, there is an angle A1 formed between the extending direction of the inside surface 140 and the extending line of the central axis I1, and the angle A1 is 45 degrees in the first embodiment.

Comparing to conventional light blocking member, the light blocking member 100 with the structure of containing angle A1 between the extending direction of the inside surface 140 and the extending direction of the central axis I1 can favor the passage of the imaging light as well as preventing the passage of flares. And that's the reason why it is so important to judge which side is the front side of light blocking member 100 in assembling process. Therefore, when the front view of the light blocking member 100 and the rear view of the light blocking member 100 are different, it is easily to identify the correct side of the light blocking member 100, and the precision of assembling process can be improved. A testing method for judging the correct side of the light blocking member 100 via a test device will be described detailedly in the following paragraph.

Figure 4A:
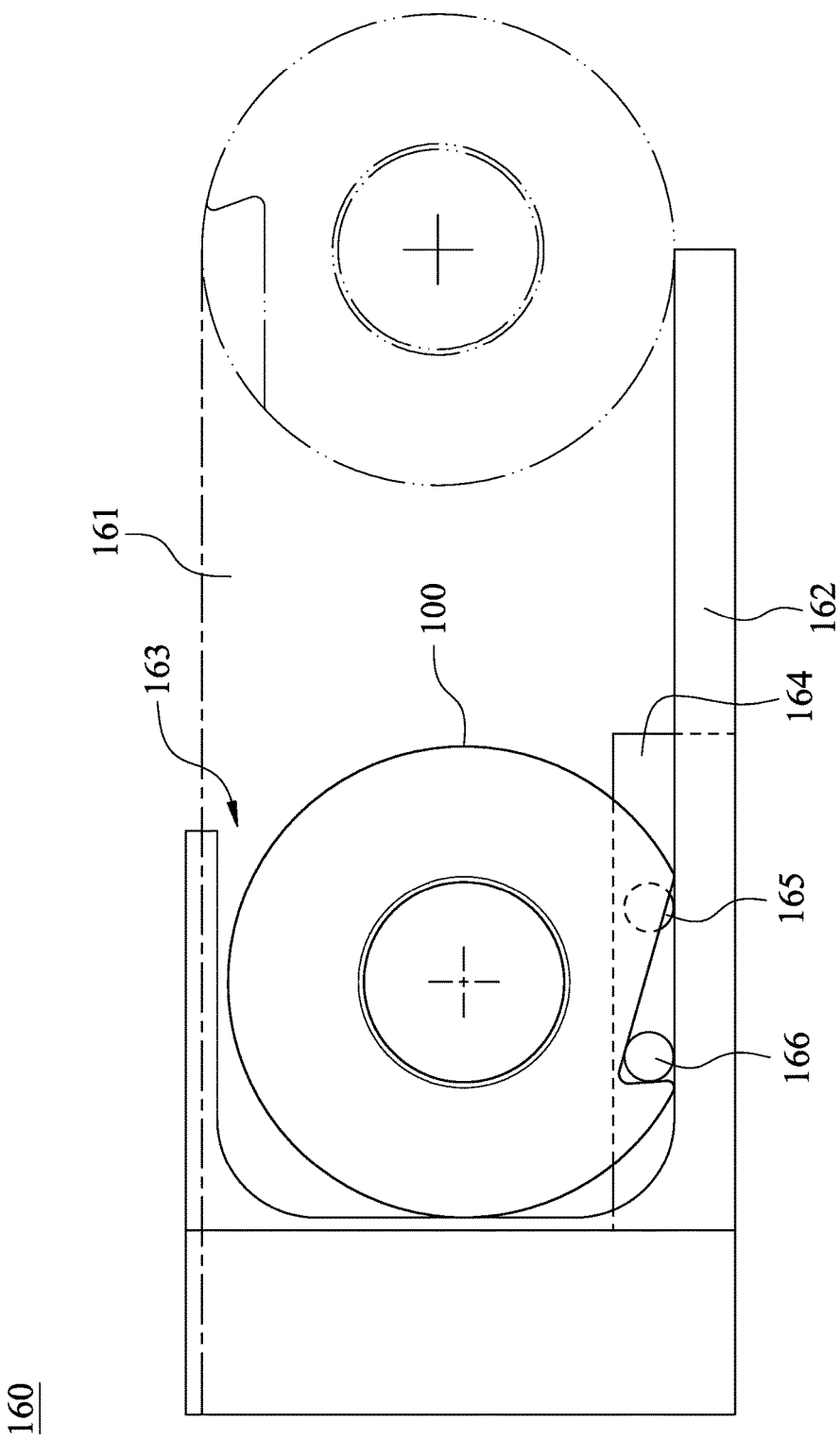
FIG. 4A is a schematic view of a testing result of the test device as illustrated in FIG. 3.

FIG. 3 is a schematic view of a test device 160 for testing the light blocking member 100 as illustrated in FIG. 1, and FIG. 4A is a schematic view of a testing result of the test device 160 as illustrated in FIG. 3. The test device 160 includes a platform 161, a block unit 162 and a test plate 164. The block unit 162 is disposed at the platform 161 to form a test area 163 for disposing the light blocking member 100.

The test plate 164 includes two circular holes 165, 166. The circular holes 165, 166 have the same size and are arranged in an interval way. As shown in FIG. 4A, the test plate 164 is disposed at the platform 161 and corresponding to the test area 163 for identifying the correct side of the light blocking member 100.

Precisely, the platform 161 is transparent and allows light passing through. A light source is projected from one side of the platform 161 to the circular holes 165, 166, and received at the other side of the platform 161. The shielding status of the circular holes 165, 166 can be confirmed so as to judging whether the front side of the light blocking member 100 is upward or downward. The test method is not limited to this.

In FIG. 4A, the light blocking member 100 is disposed in the test area 163. A shielding portion of the circular hole 165 is larger than a non-shielding portion of the circular hole 165 and a non-shielding portion of the circular hole 166 is larger than a shielding portion of the circular hole 166 due to the structure of the light blocking member 100. Therefore, the rear side of the light blocking member 100 is upward and the front side of the light blocking member 100 is downward, and the direction is correct. Because the front side of the light blocking member 100 is downward while the light blocking member 100 is assembling into an imaging lens, thus the aforementioned direction, the rear side of the light blocking member 100 being upward and the front side of the light blocking member 100 being downward, will be judged as a correct direction. If the assembly method is different from the aforementioned method, the judging result will be different and not be limited to this.

Figure 4B:
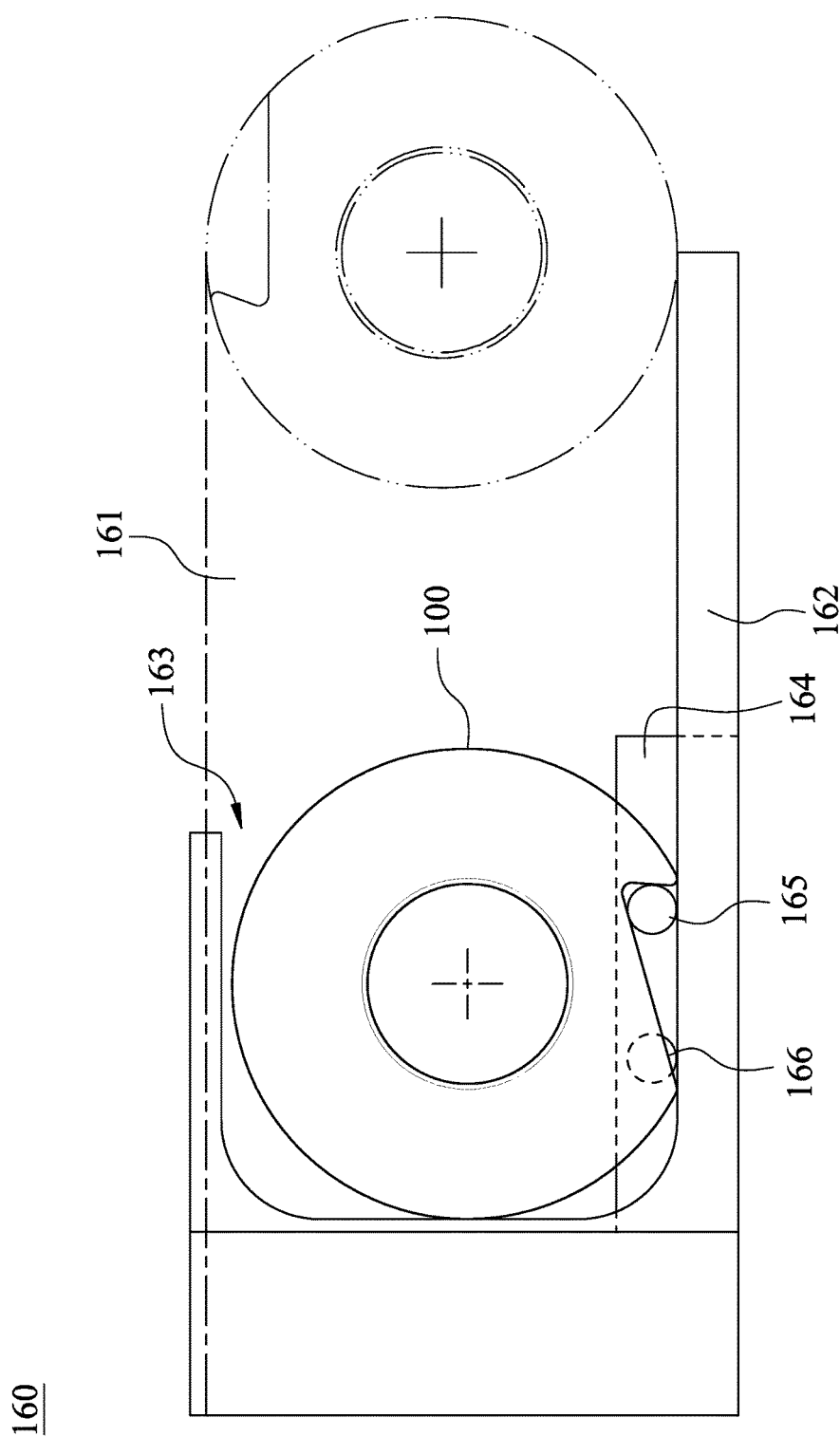
FIG. 4B is a schematic view of another testing result of the test device as illustrated in FIG. 3.
Figure 4C:
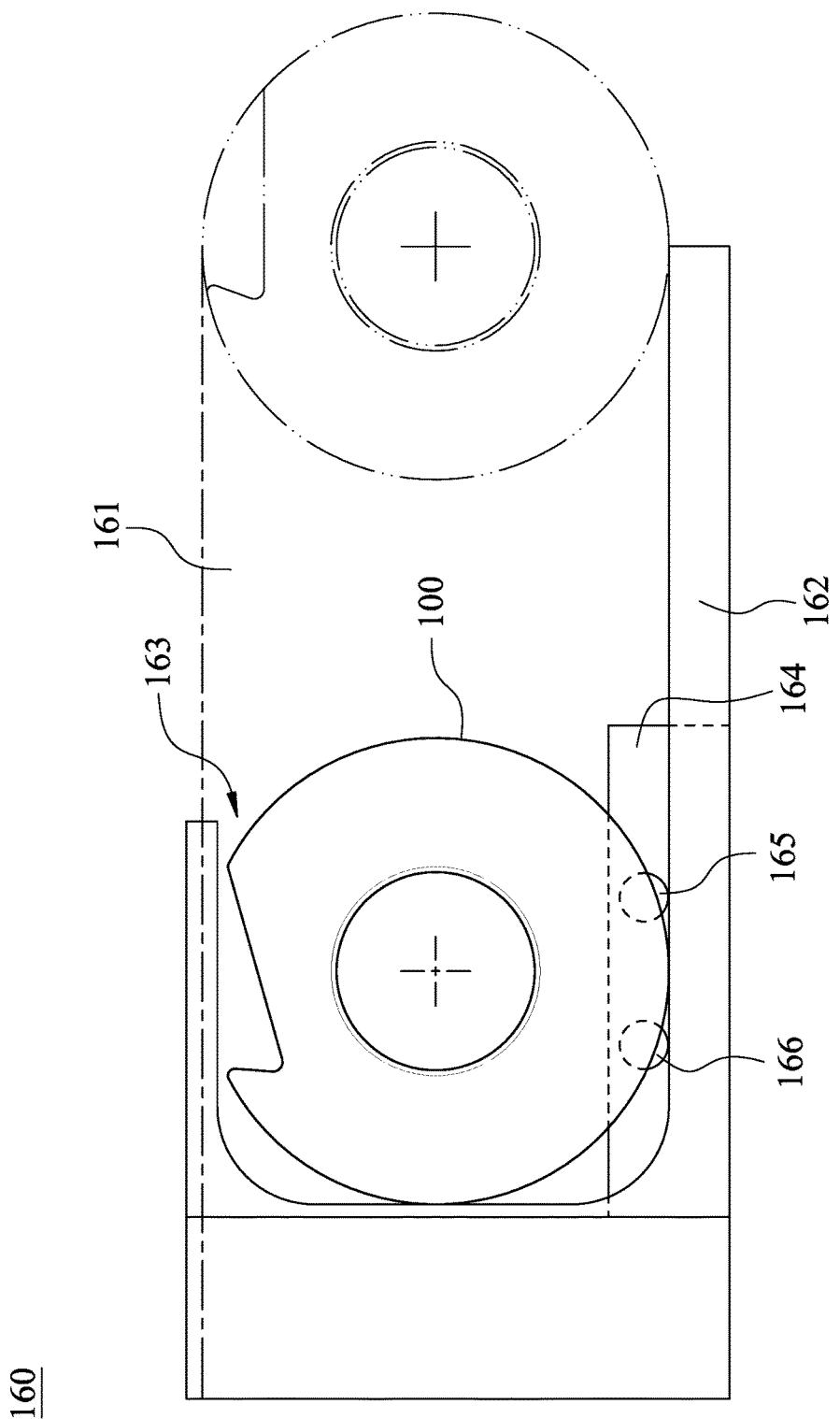
FIG. 4C is a schematic view of yet another testing result of the test device as illustrated in FIG. 3.
Figure 4D:
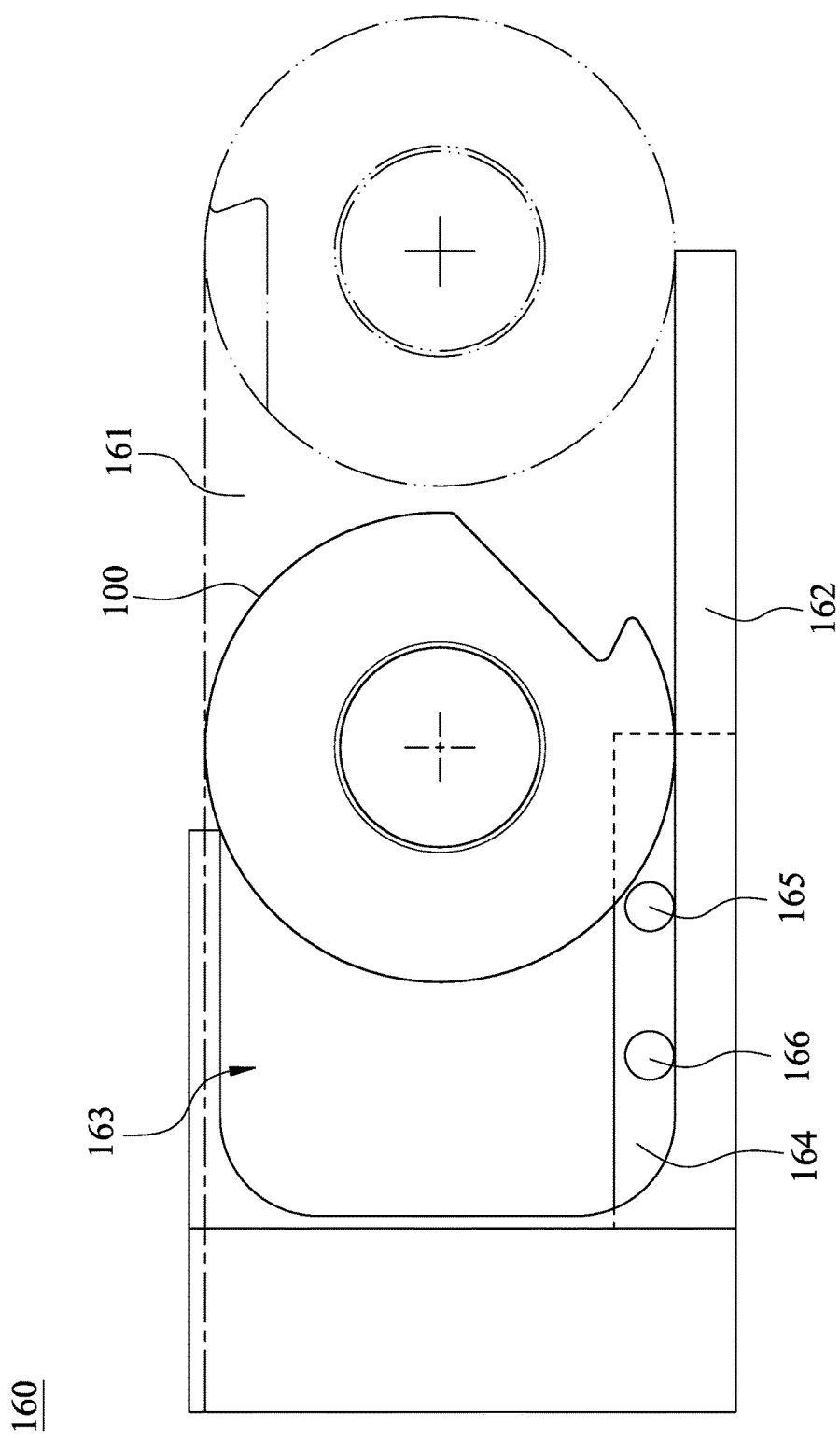
FIG. 4D is a schematic view of yet another testing result of the test device as illustrated in FIG. 3.

FIG. 4B is a schematic view of another testing result of the test device as illustrated in FIG. 3, FIG. 4C is a schematic view of yet another testing result of the test device as illustrated in FIG. 3, and FIG. 4D is a schematic view of yet another testing result of the test device as illustrated in FIG. 3. As shown in FIG. 4B, the non-shielding portion of the circular hole 165 is larger than the shielding portion of the circular hole 165 and the shielding portion of the circular hole 166 is larger than the non-shielding portion of the circular hole 166, thus the direction, the front side of the light blocking member 100 being upward and the rear side of the light blocking member 100 being downward, is incorrect.

As shown in FIG. 4C, the shielding portion of the circular hole 165 is larger than the non-shielding portion of the circular hole 165 and the shielding portion of the circular hole 166 is larger than the non-shielding portion of the circular hole 166, thus the light blocking member 100 is not in the correct testing position and a re-test shall be taken.

As shown in FIG. 4D, there are no shielding portions of both of the circulars holes 165, 166, thus the light blocking member 100 is not in the correct testing position and a re-test shall be taken.

The test device 160 described above is an exemplary embodiment, and the number of the circular holes of the test plate 164 can be more than 2 in other embodiments so as to increase the precision of the judgment for the light blocking member 100. Besides, the shape of the test plate 164 can be a circle corresponding to the light blocking member 100 or other shapes, and will not be limited to the disclosure of this embodiment.

Figure 5B:
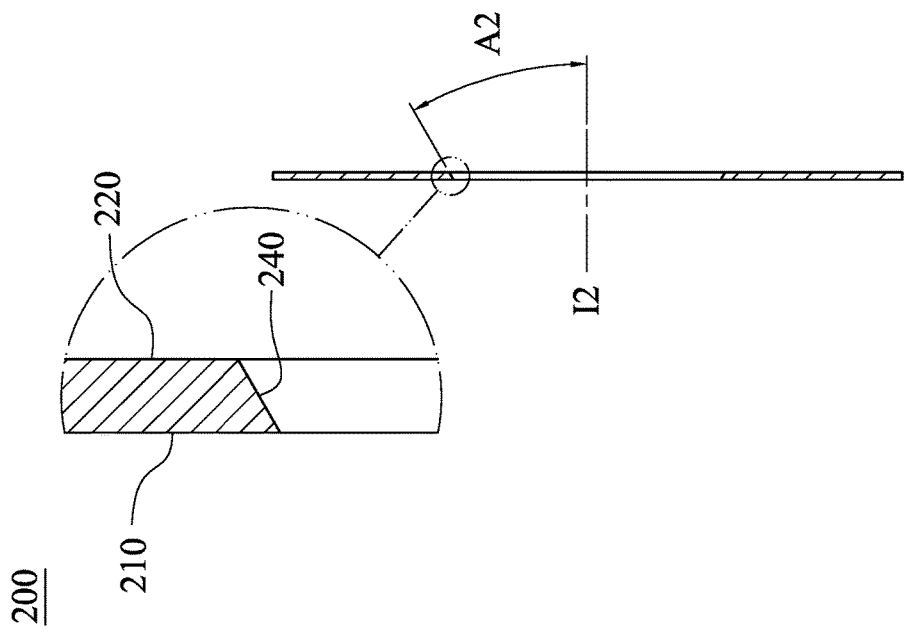
FIG. 5B is a cross-sectional view of the light blocking member as illustrated in FIG. 5A.
Figure 5A:
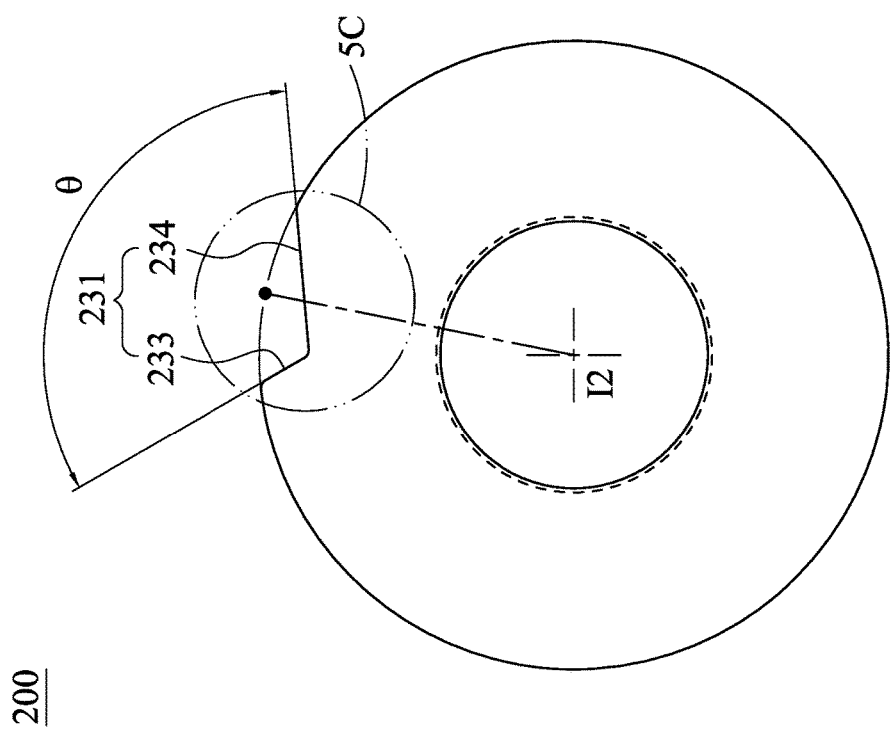
FIG. 5A is a front view of a light blocking member according to a second embodiment of the present disclosure.
Figure 5C:
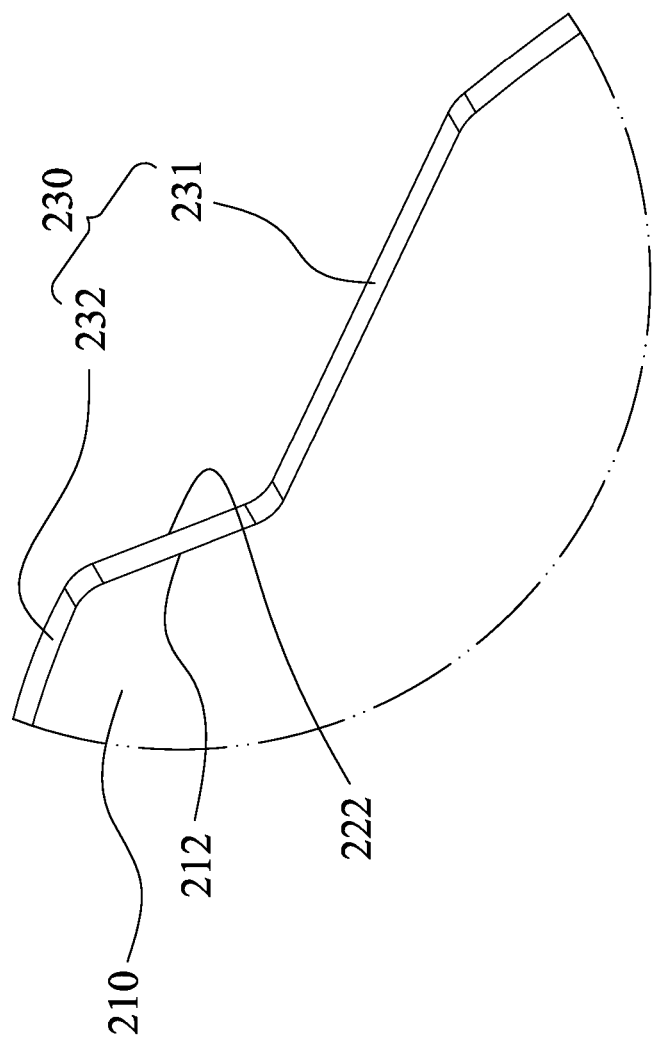
FIG. 5C is a partial schematic view of the light blocking member as illustrated in FIG. 5A.

FIG. 5A is a front view of a light blocking member 200 according to a second embodiment of the present disclosure, FIG. 5B is a cross-sectional view of the light blocking member 200 as illustrated in FIG. 5A, and FIG. 5C is a partial schematic view of the light blocking member 200 as illustrated in FIG. 5A. The structure of the light blocking member 200 of the second embodiment is similar to the structure of the light blocking member 100 as shown in FIG. 1, but the shapes of both of the first asymmetric opening 212 and the second asymmetric opening 222, the angle A2 between the extending direction of the inside surface 240 and the extending direction of the central axis I2 are different, thus the surface areas of both of the first surface 210 and the second surface 220 are different. Besides, the shapes of both of the outside surface 230 (including the arch portion 232 and the cutting portion 231) and the inside surface 240, and the surface areas of both of the outside surface 230 (including the arch portion 232 and the cutting portion 231) and the inside surface 240 are different too.

As shown in FIG. 5A, the cutting portion 231 consists of two flat areas 233, 234 in the second embodiment, and the angle θ is 115 degrees. As shown in FIG. 5B, the angle A2 is 30 degrees.

Figure 6C:
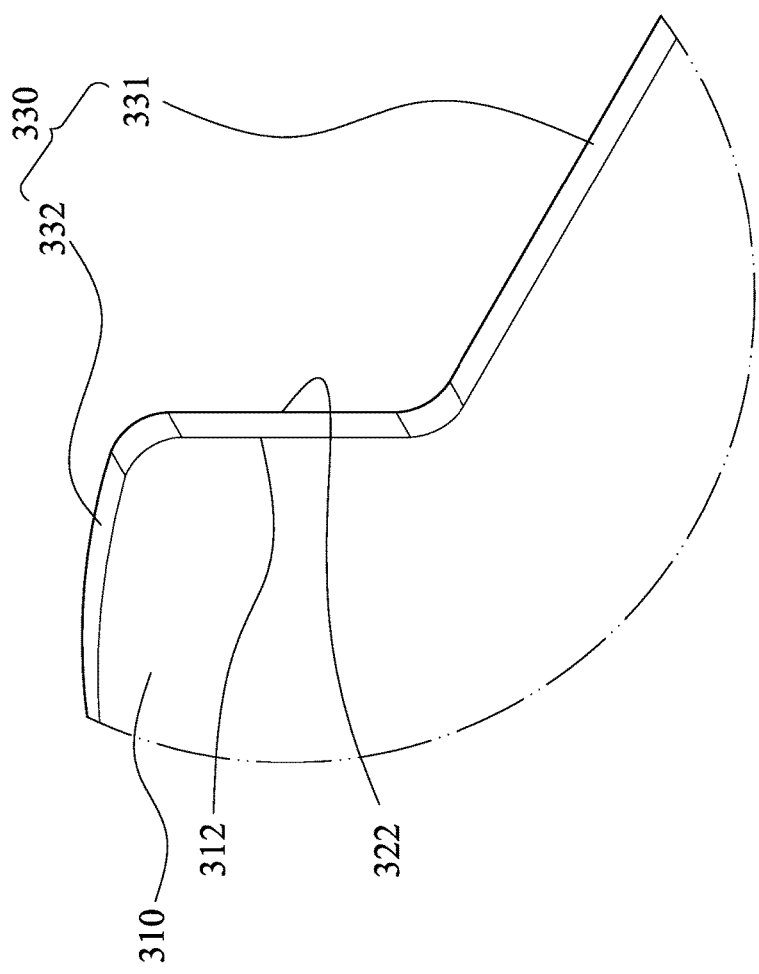
FIG. 6C is a partial schematic view of the light blocking member as illustrated in FIG. 6A.

FIG. 6A is a front view of a light blocking member 300 according to a third embodiment of the present disclosure, FIG. 6B is a cross-sectional view of the light blocking member 300 as illustrated in FIG. 6A, and FIG. 6C is a partial schematic view of the light blocking member 300 as illustrated in FIG. 6A. The structure of the light blocking member 300 of the third embodiment is similar to the structure of the light blocking member 100 as shown in FIG. 1, but the shapes of both of the first asymmetric opening 312 and the second asymmetric opening 322, the angle A3 between the extending direction of the inside surface 340 and the extending direction of the central axis I3 are different, thus the surface areas of both of the first surface 310 and the second surface 320 are different. Besides, the shapes of both of the outside surface 330 (including the arch portion 332 and the cutting portion 331) and the inside surface 340, and the surface areas of both of the outside surface 330 (including the arch portion 332 and the cutting portion 331) and the inside surface 340 are different too.

As shown in FIG. 6A, the cutting portion 331 consists of two flat areas 333, 334 in the third embodiment, and the angle θ is 90 degrees. As shown in FIG. 6B, the angle A3 is 15 degrees.

Figure 7C:
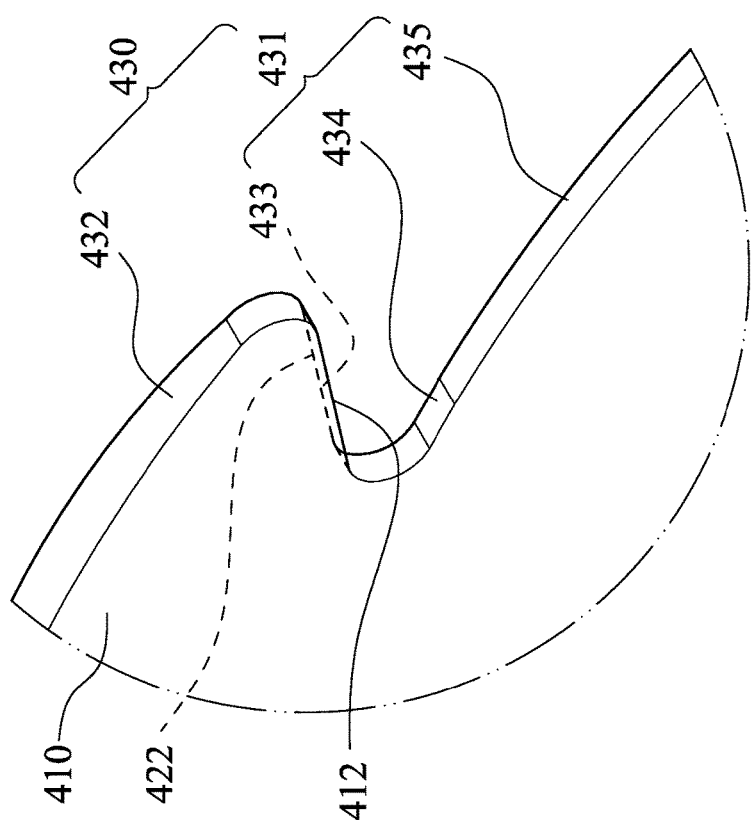
FIG. 7C is a partial schematic view of the light blocking member as illustrated in FIG. 7A.

FIG. 7A is a front view of a light blocking member 400 according to a fourth embodiment of the present disclosure, FIG. 7B is a cross-sectional view of the light blocking member 400 as illustrated in FIG. 7A, and FIG. 7C is a partial schematic view of the light blocking member 400 as illustrated in FIG. 7A. The structure of the light blocking member 400 of the fourth embodiment is similar to the structure of the light blocking member 100 as shown in FIG. 1, but the shapes of both of the first asymmetric opening 412 and the second asymmetric opening 422, the angle A4 between the extending direction of the inside surface 440 and the extending direction of the central axis I4 are different, thus the surface areas of both of the first surface 410 and the second surface 420 are different. Besides, the shapes of both of the outside surface 430 (including the arch portion 432 and the cutting portion 431) and the inside surface 440, and the surface areas of both of the outside surface 430 (including the arch portion 432 and the cutting portion 431) and the inside surface 440 are different too.

In the fourth embodiment, the cutting portion 431, as shown in FIG. 7C, consists of two flat areas 433, 434 and a curved area 435, the angle θ, as shown in FIG. 7A, is 35 degrees, and the angle A4, as shown in FIG. 7B, is 40 degrees.

As described in the preceding embodiments, the cutting portion can include at least two flat areas, or can consist of two flat areas.

In the aforementioned embodiments, a number of the first asymmetric opening is one, and a number of the second asymmetric opening is one too. In other embodiments, the number of the first asymmetric opening and the number of the second asymmetric opening can be more than one and shall correspond to each other. The shapes of the first asymmetric opening and the second asymmetric opening can be other asymmetric shapes and will not be limited to the preceding disclosure. For example, the shape of the first asymmetric opening or the second asymmetric opening can be similar to one of a shape of a numeral 6 and a shape of a numeral 9.

Besides, the light blocking member is made of carbon fiber composite material in the aforementioned embodiments, but can be replaced by other suitable materials.

FIG. 8 is a cross-sectional view of a lens assembly 500 according to a fifth embodiment of the present disclosure. The lens assembly 500 includes, from an object side B1 to an image side B2, a first lens element 510, a light blocking member 501, and a second lens element 520. The first lens element 510 includes a first axial assembling surface 511, and the second lens element 520 includes a second axial assembling surface 521. The light blocking member 501 is a light blocking member provided by the present disclosure and can be, but not be limited to, anyone of the light blocking members described in the preceding embodiments. The light blocking member 501 is disposed between the first lens element 510 and the second lens element 520, and the second axial assembling surface 521 is for assembling the first axial assembling surface 511 to align a center of the first lens element 510 and a center of the second lens 520.

Therefore, when a light (not shown) comes from an object side B1, it first enters the first lens element 510, then enters the second lens element 520 after exiting the first lens element 510, and finally exit the second lens element 520 to project to the image side B2. The light blocking member 501 is for blocking the flare to enter the second lens element 520. Because the structure of the light blocking member 501 will affect the light entering the adjacent lens, i.e. the second lens element 520, the assembling direction is needed to be correct to improve the precision of the assembling process. Through the first asymmetric opening (not shown) contained in the first surface 502 and the second asymmetric opening (not shown) contained in the second surface 503, the front side and the rear side can be correctly identified so as to favor the assembling process.

In the fifth embodiment, the light blocking member 501 has a maximum diameter D1, the first axial assembling surface 511 has a minimum diameter D2, and the maximum diameter D1 is equal to the minimum diameter D2. In other embodiments, the minimum diameter D2 can be contained by the second axial assembling surface 521, and the maximum diameter D1 can be, but not be limited to, smaller than or equal to the minimum diameter D2.

Figure 9:
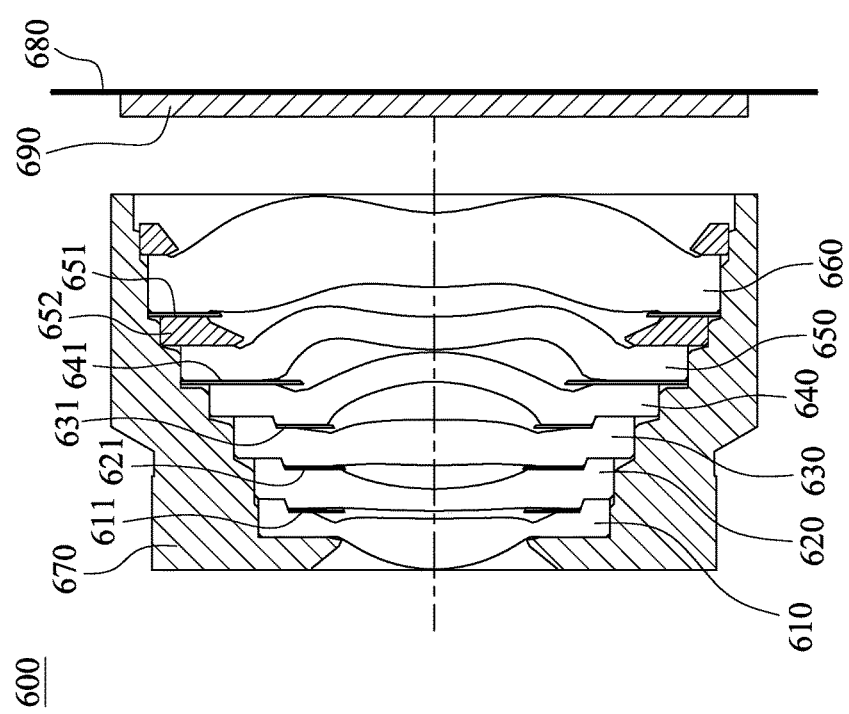
FIG. 9 is a cross-sectional view of an imaging lens according to a sixth embodiment of the present disclosure.

FIG. 9 is a cross-sectional view of an imaging lens 600 according to a sixth embodiment of the present disclosure. The imaging lens 600 includes a barrel 670, a lens assembly (not labeled), and an image sensor 690. The lens assembly includes a first lens element 610, a second lens element 620, a third lens element 630, a fourth lens element 640, a fifth lens element 650, a sixth lens element 660 and an image surface 680.

The first lens element 610, the second lens element 620, the third lens element 630, the fourth lens element 640, the fifth lens element 650, and the sixth lens element 660 are disposed in the barrel 670 from an object side to an image side, and the lens assembly further includes five light blocking members 611, 621, 631, 641, and 651 disposed between each of the two lens elements respectively. Precisely, the light blocking member 611 is disposed between the first lens element 610 and the second lens element 620, the light blocking member 621 is disposed between the second lens element 620 and the third lens element 630, the light blocking member 631 is disposed between the third lens element 630 and the fourth lens element 640, the light blocking member 641 is disposed between the fourth lens element 640 and the fifth lens element 650, and the light blocking member 651 and a spacer 652 are disposed between the fifth lens element 650 and the sixth lens element 660.

The structures and relationships of the first lens element 610, the light blocking member 611, and the second lens 620 are the same with the lens assembly 500 in the fifth embodiment, and will not describe again herein. Each of the light blocking members 611, 621, 631, 641, and 651 is a light blocking member provided in the present disclosure, and can be, but not limited to, anyone of the aforementioned light blocking members provided in the first to fourth embodiments. The image sensor 690 is disposed on an image surface 680 to receive the light which enters the imaging lens 600 and forms an image.

Therefore, the correctly assembled light blocking members 611, 621, 631, 641, and 651 facilitate the improvement of the imaging lens and the increase of the manufacturing yield, and can reduce the flare effectively to prevent a bad influence of the imaging quality.

According to the aforementioned embodiments, the present disclosure has the following advantages.

1. The structure that the shapes of both of the first asymmetric opening and the second asymmetric opening with respect to the virtual line are asymmetric can favor to identify the front side and the rear side of the light blocking member so as to get the correct assembling direction and increase the precision of the assembling process.

2. Due to a reason of simple structure, the light blocking member is easily to be made when the cutting portion consist of two flat areas.

3. If the condition, 20 degrees<θ<120 degrees, is satisfied, the identification of both of the front side of the light blocking member and the rear side of the light blocking member is increased. Preferably, if the condition, 60 degrees<θ<100 degrees, is satisfied, the light blocking member is more easily manufactured. If the shape of the first asymmetric opening or the shape of the second asymmetric opening is similar to one of the shape of a numeral 6 and the shape of a numeral 9, the identification will become better.

4. If an angle contained between the extending direction of inside surface and the extending direction of the central axis, the ability of the light blocking member to block the flare without influencing the passage of the imaging light can be improved. Therefore, when the light blocking member is assembled into a lens assembly or an imaging lens, the imaging quality will be improved too.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A lens assembly, comprising:
a first lens element comprising a first axial assembling surface;
a second lens element comprising a second axial assembling surface, wherein the second axial assembling surface is for assembling the first lens element and the second lens element to align a center of the first lens element and a center of the second lens element; and
a plurality of light blocking members coaxially disposed in the lens assembly;
wherein at least one of the plurality of light blocking members is disposed between the first lens element and the second lens element, the light blocking member has a maximum diameter, one of the first axial assembling surface and the second axial assembling surface has a minimum diameter, and the maximum diameter of the light blocking member is smaller than or equal to the minimum diameter of one of the first axial assembling surface and the second axial assembling surface;
wherein one of another one of the plurality of light blocking members and the at least one of the plurality of light blocking members comprising:
a first surface with a central hole, the first surface comprising a first asymmetric opening;
a second surface with a central hole, the second surface being corresponding to the first surface and comprising a second asymmetric opening corresponding to the first asymmetric opening;

an outside surface disposed between the first surface and the second surface, comprising:
  a cutting portion connecting the first asymmetric opening and the second asymmetric opening; and
  an arch portion connecting an edge of the first surface and an edge of the second surface, and connected to two ends of the cutting portion; and
an inside surface disposed between the first surface and the second surface, the inside surface connecting the central hole of the first surface and the central hole of the second surface;
wherein a virtual curved surface is formed between the two ends of the cutting portion, a virtual line perpendicular to a central axis of the another one light blocking member is formed between a central point of the virtual curved surface and the central axis of the another one light blocking member, two shapes of both of the first asymmetric opening and the second asymmetric opening with respect to two sides of the virtual line are asymmetric.

2. An imaging lens, comprising:
the lens assembly of claim 1; and
an image sensor, wherein the image sensor is disposed on an image surface of the lens assembly.

3. The lens assembly of claim 1, wherein an angle is formed between an extending direction of the inside surface and an extending direction of the central axis.

4. The lens assembly of claim 1, wherein the cutting portion comprises at least two flat areas.

5. The lens assembly of claim 4, wherein an angle $\theta$ is formed between the two flat areas, and the following condition is satisfied:

$$20 \text{ degrees} < \theta < 120 \text{ degrees}.$$

6. The lens assembly of claim 4, wherein the cutting portion consists of two flat areas.

7. The lens assembly of claim 5, wherein the angle $\theta$ is formed between the two flat areas, and the following condition is satisfied:

$$60 \text{ degrees} < \theta < 100 \text{ degrees}.$$

8. The lens assembly of claim 1, wherein a number of the first asymmetric opening is one, and a number of the second asymmetric opening is one.

9. The lens assembly of claim 1, wherein the plurality of light blocking members are made of carbon fiber composite material.

10. The lens assembly of claim 1, wherein the shape of the first asymmetric opening or the shape of the second asymmetric opening is similar to one of a shape of a numeral 6 and a shape of a numeral 9.

11. The lens assembly of claim 1, wherein the lens assembly comprises six lens elements.

\* \* \* \* \*

UNITED STATES PATENT AND TRADEMARK OFFICE
CERTIFICATE OF CORRECTION

PATENT NO. : 9,829,609 B2  
APPLICATION NO. : 15/494700  
DATED : November 28, 2017  
INVENTOR(S) : Chou Page 1 of 1

It is certified that error appears in the above-identified patent and that said Letters Patent is hereby corrected as shown below:

In the Claims

In Claim 5 (Column 10, Line 3), please delete the number "8" and insert therefor: -- $\theta$ --

In Claim 7 (Column 10, Line 10), please delete the number "8" and insert therefor: -- $\theta$ --

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*